July 27, 1943.   H. K. THOMAS   2,325,346
FOLDING CAMERA
Filed Sept. 29, 1941   4 Sheets-Sheet 4

INVENTOR
HUGH KERR THOMAS
BY Horridge and Dowd
ATTORNEYS

Patented July 27, 1943

2,325,346

UNITED STATES PATENT OFFICE 2,325,346

FOLDING CAMERA

Hugh Kerr Thomas, Hadley Wood, Barnet, England, assignor to The Houghton-Butcher Manufacturing Company, Limited, London, England, an English limited-liability company Application September 29, 1941, Serial No. 412,785
In Great Britain September 30, 1940

4 Claims. (Cl. 95—40)

This invention relates to folding cameras and particularly to folding or collapsible means for locating and supporting the hinged baseboard structure and the lens panel rigidly in position for use. Known erecting mechanisms have in general comprised several pairs of surfaces connected by a mechanical linkage and requiring to be brought simultaneously to a predetermined position. Such simultaneous location in exact position, of a number of linked components, presents considerable difficulty in manufacture and has the added disadvantage that unequal wear of the various components may subsequently render impossible their exact positioning, despite careful initial adjustment.

The present invention has for an object to provide an improved erecting mechanism whereby these drawbacks may be avoided.

According to the invention moving members of erecting mechanism for a folding camera are brought successively into locating and supporting contact as the baseboard is moved into position for use. Thus each of such members is positively located individually as the camera is opened for use and play due to wear or errors of manufacture is automatically taken up.

According to a feature of the invention pins on spaced articulated limbs by which the forward part of the hinged baseboard is supported cooperate with rearwardly directed locating surfaces on a lens carrier and further locating surfaces of the latter cooperate with corresponding surfaces on the baseboard structure when the camera is ready for use.

Thus a lens carrier supported by struts attached at their ends to said carrier and to the baseboard respectively, may have large locating surfaces directed downwardly and smaller surfaces directed towards the camera body or frame, said struts being in loose pin and slot engagement with the lower parts of articulated links supporting the baseboard, the arrangement being such that one or more springs acting on the links hold the pins of said pin and slot connections against the small locating surfaces of the lens carrier when the camera is ready for use and hence the large locating surfaces of the latter against those of the baseboard.

In order that the invention may be clearly understood and readily carried into effect, a preferred construction is hereinafter more fully described with reference to the accompanying drawings which are given by way of example only and not of limitation.

Figure 1:
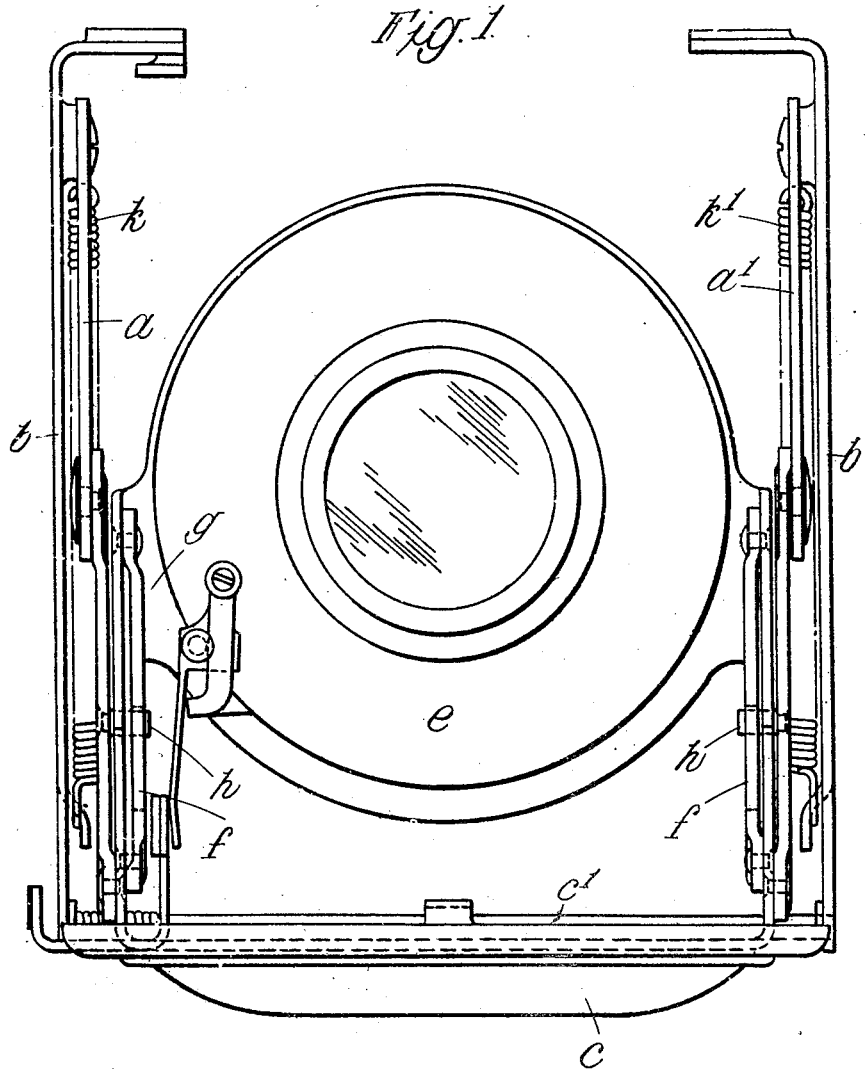
Fig. 1 is a front elevation of the erecting mechanism in open position.
Figure 2:
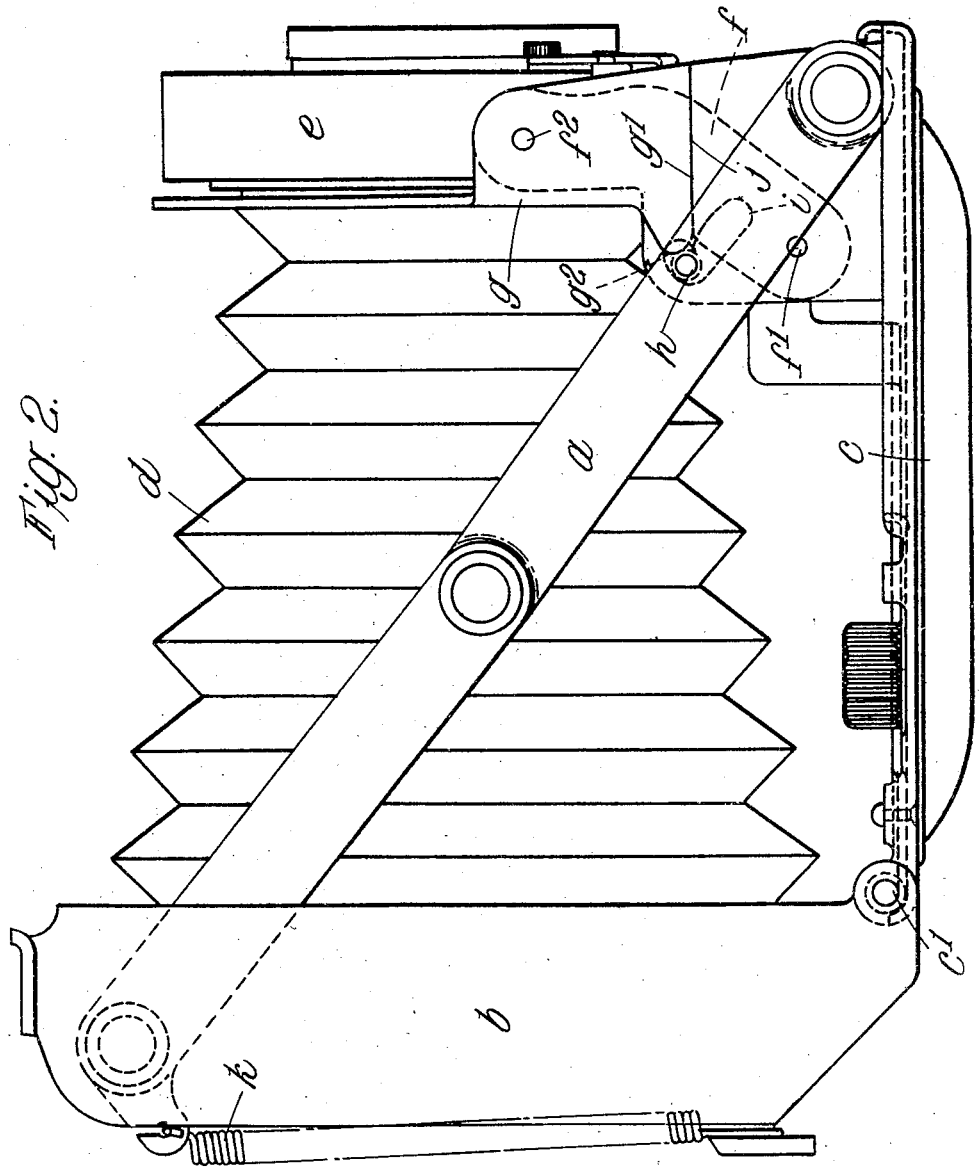
Fig. 2 is a side elevation corresponding to Fig. 1.
Figure 3:
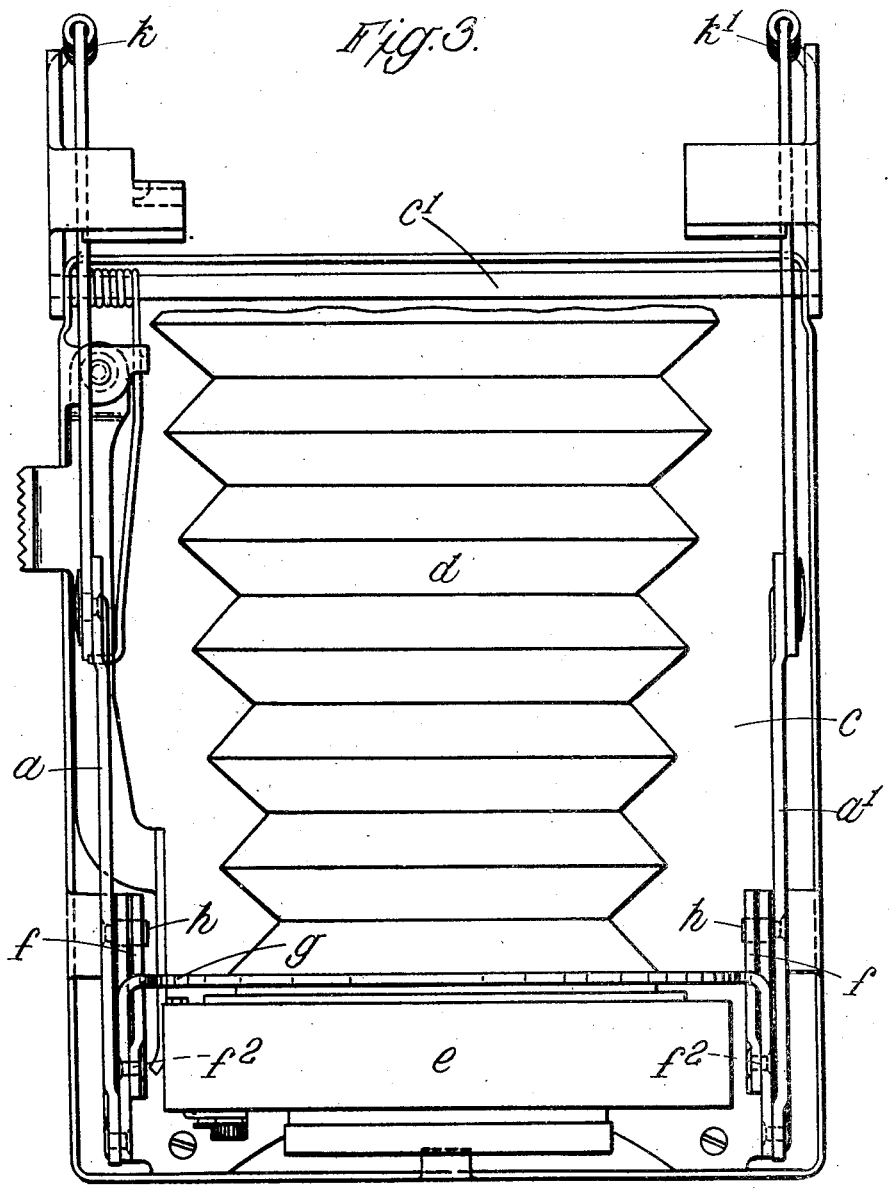
Fig. 3 is a plan view.
Figure 4:
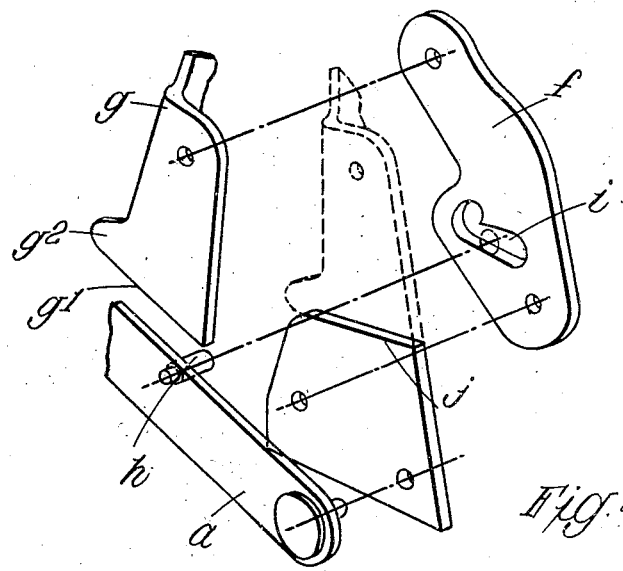
Figs. 4 and 5 are exploded views of the main locating elements in partly and fully closed positions respectively.
Figure 5:
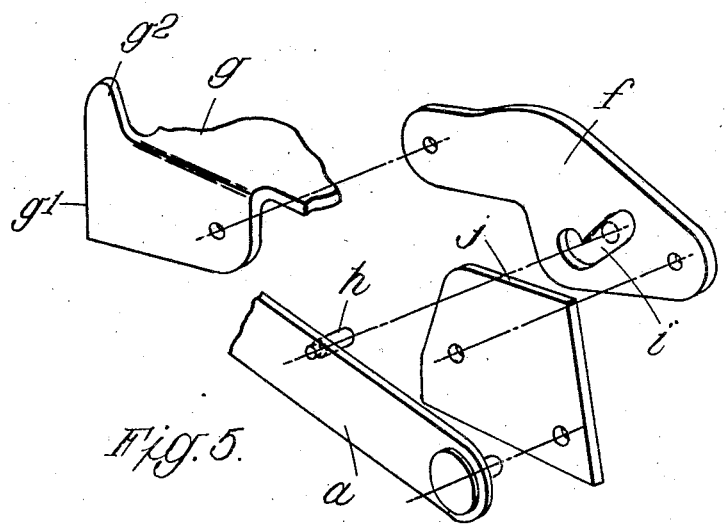

Referring now to the said drawings; spaced parallel links $a$, $a'$ pivoted at their ends to the upper part of the camera frame or body $b$ and to the forward part of the hinged baseboard structure $c$ respectively accommodate between them the usual bellow $d$ and the lens carrier $e$. These links $a$, $a'$ are articulated substantially midway of their length, about axes parallel with the baseboard hinge $c'$ and are almost but not quite fully extended or aligned when the baseboard $c$ is in position for use as shown in the drawings, their articulations moving towards the baseboard hinge $c'$ as the camera is closed. At each side of the baseboard $c$ at its forward part, but nearer the hinge $c'$ than the articulated link pivots, a strut $f$ is pivoted thereto at $f'$ about an axis parallel with the hinge axis. Each strut $f$ extends, when the camera is ready for use, forwardly across the lower part of the corresponding articulated link to a further parallel pivot $f^2$ whereby an apertured lens-carrying plate $g$ is attached. The lower part of each articulated link has projecting rigidly therefrom parallel with the baseboard hinge axis a locating pin $h$ which engages loosely in a substantially L-shaped slot $i$ in the corresponding pivoted strut $f$, one limb of said slot being short and extending lengthwise of the strut (i. e. transversely of the link when extended). The other limb of the slot is longer and extends transversely of the strut (i. e. longitudinally of the link when extended) as may be clearly seen from Fig. 2.

The lens panel $g$ is extended away from the pivots $f^2$ securing it to the struts $f$ and presents at each side thereof a locating surface $g'$ of considerable dimensions measured from front to rear of the baseboard structure which latter is formed with locating surfaces $j$ for cooperation with said surfaces $g'$ of the lens panel $g$. At or near the rearward end of each locating surface $g'$ the lens panel $g$ presents towards the camera body a further locating surface $g^2$ against which bears the locating pin $h$ of the corresponding articulated link $a$, $a'$ when the baseboard is fully extended (see Fig. 2).

The two articulated links $a$, $a'$ are influenced by springs $k$, $k'$ to assume their fully extended or aligned positions but are prevented from quite doing so by the engagement of the locating surfaces $g'$ of the lens panel $g$ with the locating surfaces $j$ of the baseboard and of the locating pins $h$ of the articulated links $a, a'$ with the locating surfaces $g^2$ respectively, when the camera is opened, said locating pins $h$ being then in the short limbs of the slots $i$ in said struts $f$.

As the camera is opened by swinging the baseboard $c$ about its pivot, the lens panel $g$ is moved away from the camera body in a forward direction along substantially a straight line, during which time the pivoted struts $f$ swing about their pivots to the baseboard and the articulated links $a, a'$ straighten until just before they reach alignment, when the locating surfaces $g'$ and $j$ come into contact. The pins $h$ carried by the links $a, a'$ thereupon are pressed against the locating surfaces $g^2$ on the lens panel $g$ which is held firmly erect with the baseboard fully extended by the pressure of the springs $k, k'$. Thus, it will be seen that the effect of wear in any of the parts or of minor inaccuracies in manufacture will be automatically compensated since the locating members come independently and successively in limiting positions.

To close the camera the articulations of the links $a, a'$ are pushed towards the baseboard hinge $c'$, thus shifting the locating pins $h$ into the long limbs of the slots $i$, and causing swinging the struts $f$ about their baseboard pivots towards the camera body initially to lift the locating surfaces $g'$ off the locating surfaces $j$ and thereafter permit continued relative movements of the parts of the erecting mechanism during the swinging of the baseboard into closed position against the action of the springs $k, k'$ where it is retained by a suitable catch as is customary.

What I claim is:

1. In a folding camera, a lens panel erecting mechanism including spring loaded articulated links which support the forward part of a baseboard on which the lens panel is to be erected, locating surfaces on said lens panel, cooperating locating surfaces on said baseboard with which said locating surfaces engage when said panel is erected, pins on said articulated links, and rearwardly directed abutment surfaces also on said lens panel and adapted to be engaged by said pins after said surfaces have been brought into engagement and to maintain said engagement.

2. In a folding camera, a hinged baseboard, spring loaded articulated links for supporting the forward part of said baseboard, a lens panel erected on said baseboard, slotted struts pivoted to said baseboard and pivotally supporting said lens panel, locating surfaces on said lens panel, cooperating locating surfaces on said baseboard with which said locating surfaces engage when said panel is erected, rearwardly directed abutment surfaces on said panel, and pins carried by said articulated links and extending through the slots in said struts and adapted to engage said abutment surfaces after said locating surfaces have come into engagement and to maintain such engagement.

3. In a folding camera, a hinged baseboard, a pair of articulated links for supporting the forward part of said baseboard, spring means independently loading each of said links, a lens carrying panel erected on said baseboard, slotted struts pivoted to said baseboard and pivotally supporting said lens panel, locating surfaces on said lens panel, cooperating locating surfaces on said baseboard with which said locating surfaces on said lens panel engage when said lens panel is erected, rearwardly directed abutment surfaces on said panel, and pins carried by said articulated links and extending through the slots in said struts and adapted to engage said abutment surfaces after said locating surfaces have come into engagement with said cooperating locating surfaces on said baseboard and to maintain said engagement.

4. In a folding camera including a lens panel and a baseboard, a lens panel erecting mechanism comprising a locating surface on the lens panel, a cooperating locating surface on the baseboard, linkage means for bringing said locating surfaces into contact with one another upon the erection of said lens panel, and locking means brought into action by said linkage means after said locating surfaces have been brought into contact with one another and operative to maintain said contact.

HUGH KERR THOMAS.